US009433979B2

(12) United States Patent
McClister et al.

(10) Patent No.: US 9,433,979 B2
(45) Date of Patent: Sep. 6, 2016

(54) METHOD OF MANUFACTURING A REMOTELY OPERATED WHEELED HIGH PRESSURE WASH SYSTEM

(71) Applicant: Veolia ES Industrial Services, Inc., Chicago, IL (US)

(72) Inventors: William J. McClister, LaPorte, TX (US); Ronald Burkes, Baytown, TX (US)

(73) Assignee: VEOLIA ES INDUSTRIAL SERVICES, INC., Chicago, IL (US)

(*) Notice: Subject to any disclaimer, the term of this patent is extended or adjusted under 35 U.S.C. 154(b) by 429 days.

(21) Appl. No.: 14/020,990

(22) Filed: Sep. 9, 2013

(65) Prior Publication Data

US 2015/0068012 A1 Mar. 12, 2015

(51) Int. Cl.
*B08B 3/02* (2006.01)
*B25J 11/00* (2006.01)
*E02F 9/20* (2006.01)

(52) U.S. Cl.
CPC ............... *B08B 3/02* (2013.01); *B08B 3/024* (2013.01); *B25J 11/0085* (2013.01); *E02F 9/205* (2013.01); *Y10T 29/49428* (2015.01); *Y10T 29/49716* (2015.01); *Y10T 29/49826* (2015.01)

(58) Field of Classification Search
CPC ..... B08B 3/02; B08B 3/024; B08B 2203/00; B08B 2203/02; B08B 2203/0205; B08B 2203/0211; B08B 2203/0241; B08B 9/04–9/0497; B25J 11/0085; B05B 15/08; B05B 1/12; B05B 1/14; B05B 15/1061; B05B 7/0093; B60P 3/426; B60P 3/2215; E02F 9/205; E01H 1/10–1/108; Y10T 29/49826; Y10T 29/49716; Y10T 29/49428
See application file for complete search history.

(56) References Cited

U.S. PATENT DOCUMENTS

| | | | | |
|---|---|---|---|---|
| 3,889,976 A * | 6/1975 | Jesswein | ............... | B62D 49/007 172/781 |
| 4,162,796 A * | 7/1979 | Mead | ..................... | B62D 49/02 280/400 |
| 6,640,409 B2 * | 11/2003 | Sharkness | ............... | E02F 3/384 29/401.1 |
| 7,055,615 B2 * | 6/2006 | Dillman | ................. | A62C 27/00 169/24 |
| 7,073,734 B2 * | 7/2006 | Dorendorf | ............ | B05B 7/0416 239/318 |
| 7,520,411 B2 * | 4/2009 | Bieker | .................... | B60P 3/426 169/24 |
| 8,021,077 B2 * | 9/2011 | Annese | ................. | E01C 19/004 118/305 |

FOREIGN PATENT DOCUMENTS

JP          52036865 A *  3/1977 ............... B08B 3/02

* cited by examiner

*Primary Examiner* — Sarang Afzali
(74) *Attorney, Agent, or Firm* — McDonnell Boehnen Hulbert & Berghoff LLP

(57) ABSTRACT

A process for the manufacture of a washing system to clean process equipment and the resulted washing system is disclosed. The method involves the conversion and transformation of a small excavation tractor into a remotely operated hydroblasting system that removes the operator from the working environment and avoids the risks of harm and fatigue normally associated with existing cleaning processes.

8 Claims, 6 Drawing Sheets

METHOD OF MANUFACTURING A REMOTELY OPERATED WHEELED HIGH PRESSURE WASH SYSTEM

FIELD OF THE INVENTION

Our invention relates generally to a novel method of manufacture where a compact conventional excavating tractor is converted into a remotely operated, computer controlled, high-pressure wash system for cleaning large process equipment, such as pipes, heat transfer surfaces, and vessels, to remove dirt, sludge, oil, grease, and other contaminates that build-up on the surface of the equipment or cause blockages of process fluid pathways. More specifically, our invention transforms a manually operated small excavating tractor to a high-pressure wash system that eliminates the need for a riding operator and where the wash system is remotely operated through manipulation of electronic joysticks.

BACKGROUND

Cleaning of fouled or scaled industrial process equipment is typically conducted using a high-pressure lance that is held and manipulated by a human operator. The operator must move and aim the lance to direct a stream of high pressure cleaning solution, typically water, at close range against the process equipment to be cleaned. Not only does this close range working environment expose the operator to potentially hazardous splash back (blowback) of the cleaning solution and removed contaminates, but it also requires that the operator constantly exert a force to counter the force exerted by the lance due to the exiting high pressure cleaning solution. This counter acting force is similar to the effort exerted by a fire fighter handling and aiming a high-pressure fire hose. Because the operator is capable of exerting only a certain limited amount of counter force, this greatly limits the maximum force or thrust that can be used in a typical cleaning lance. The physical exertion required by the operator can cause rapid operator fatigue typically resulting in losing control of the lance and causing harm to himself and to his surroundings. To avoid such fatigue, the operator is required to take frequent breaks or to work with a team of operators each taking turns with the lance, both of which increase the cost and time required to perform a given cleaning project.

Such manual operator cleaning methods that employ a high-pressure lance also require that the operator wear special protective clothing to avoid being exposed to a blowback mix of cleaning solution and the material being removed from the process equipment. This blowback can collect on an operator's safety shield or visor significantly reducing visibility causing an unsafe condition and thus requiring frequent cleaning, again reducing the efficiency of the cleaning process. The close proximity required when using a lance for cleaning also means the operator must stand and move around on slippery surfaces caused by pooling of the blowback mix that will typically contain oily components. In some cases, depending on the geographic location, this blowback mix can freeze, further increasing the risk of an accident.

Some of these problems associated with using a handheld high-pressure lance to clean industrial equipment have been solved by the use of a large tractor, such as a backhoe, that is fitted with a spray head on the articulating arm. These large tractors require an operator to sit in an operator's compartment on the tractor and to manually manipulate the hydraulic controls to move the tractor and the arm. Manual manipulation of the hydraulic valves using levers is cumbersome and awkward when it comes to directing the spray nozzles at or into the convoluted and complex sections and pieces of most process equipment. Also, the hydraulic valves on these tractors have such large flow rates that precise control is seldom possible by human manipulation of the levers that are directly attached to and physically manipulate the valves. Also, because of the large physical size of these tractors their use is limited to only large outdoor areas where they can be safely maneuvered. Indoor operation or within a small outdoor footprint is extremely difficult if not impossible.

Accordingly, there is a need in the art of industrial high-pressure cleaning for a safer and smaller device to perform such hydroblasting pressure washing of industrial process equipment. Our invention solves this need by converting a small compact tractor originally designed and built for excavating projects into a remotely operated high pressure washing system that protects the operator and greatly increases the cleaning efficiency. These and other advantages will become evident from the following more detailed description of the invention.

SUMMARY

As mentioned, our invention transforms a manually operated small excavating tractor having a hydraulically operated articulating arm with an attached excavation tool and that is configured for a riding human operator who must manually manipulate hydraulic valves using control levers. The end result is a remotely operated washing system where a remote operator control panel is connected to a computer control system that is in communication with a system of electrohydraulic valves that in turn controls the mechanical movements of the articulating arm and an attached high pressure spray head. The manufactured small remotely operated tractor is used for cleaning industrial process equipment using high a pressure cleaning solution.

The first step in the manufacturing process involves obtaining or acquiring a small, compact, motor driven wheeled tractor having a width of less than 5 feet, preferably about 3 feet in width. Such a tractor would include an operator area comprising a seat, levers for manual control of mechanical hydraulic valves, a safety cage or enclosure to surround and protect the operator, and a hydraulically operated arm having where the working end of the arm (the distal end) is configured to attach an excavation tool, such as a backhoe bucket or jack hammer. After acquiring the tractor, the next step involves removing or dismantling many of the original parts and features originally present and necessary to perform traditional excavation. Specifically, the operator area that is completely dismantled in a fashion such that an operator could no longer ride or operate the tractor. This step involves the removal of the seat, the safety cage and/or enclosure, the manually operated hydraulic control assembly comprising the operator control levers and the mechanical hydraulic valves that the levers engage to physically manipulate the valves. The original hydraulic lines are not removed, however, new lines are added as will be described in more detail below. Additionally, if an excavation tool was connected to the distal end of the arm this would be removed as well. The tractor engine and the pump for the hydraulic fluid lines remain in place.

Next, an assembly of electrohydraulic valves is acquired and installed on the main tractor body to replace the manually operated hydraulic valves that were removed as part of the control assembly from the operator area. These substituted electrohydraulic valves are connected to the original hydraulic lines to allow operation of the various original hydraulic cylinders that control the arm and that move the tractor forward/backward and allow the main body to pivot relative to the tracks. One benefit of replacing the existing hydraulic valves is that the flow rate of hydraulic fluid through the valves can be greatly reduced by using lower volume electrohydraulic valves. This allows for more precise control of the connected hydraulically operated equipment. Typically, the original mechanical hydraulic valves have a flow rate of about 6-10 gallons/min whereas our invention will install electrohydraulic valves preferably having a flow rate of about 1-2 gallons/min.

The electrohydraulic valves of our invention, unlike the manually operated hydraulic valves they replace, are a combination of electrical components and mechanical components. Specifically, the electrohydraulic valves use low voltage solenoids to move the spools in the mechanical portion of the valves and are controlled by one or more computers. Such valves provide manipulation of the hydraulics on the tractor at a level of precision not possible by a human operator manipulating the manual levers of the original equipment. The number of electrohydraulic valves in the assembly is typically greater than the original number of the manually operated hydraulic valves because our invention also requires the installation of additional hydraulic cylinders not originally present on the original excavation tractor. For example, the added high-pressure spray head, as described in more detail below, has one or more hydraulic cylinders associated with it that allows the spray head to move, for example, in a side-to-side motion. Any number of additional electrohydraulic valves may be added to control the activation of added hydraulic cylinders, valves, motors and like equipment not originally present on the tractor, but added during the transformation of the tractor into the remotely controlled wash system.

To the extent additional hydraulically operated components are added to the tractor, then additional hydraulic lines are also added to supply the necessary high-pressure hydraulic fluid to the newly added components. Preferably we add two electrohydraulic valve assemblies to control an average of nine work stations. These electrohydraulic valves can be custom designed and assembled specifically for the application described herein by Hydradyne Hydraulics LLC from components manufactured by Parker Hannifin. Flow rate through the valves is directly proportional to electrical signal voltage input received from the computer. The computer enables the opening of multiple work sections of the electrohydraulic valves, at varying voltage levels, with a single input stroke of the joystick control. This provides for complex motion control of the articulating arm.

The electrohydraulic valves are conveniently positioned in an assembly located generally in the same location as the removed manual controlled valve assembly. Preferably, the new electrohydraulic valves are arranged as an assembly and enclosed within a protective box or housing that prevents damage due to flying debris, moisture, contaminants, and accidental impacts. The electrohydraulic valves are connected to electrical wires that are preferably bundled in a single cable that exit a single sealed opening in the housing. This cable is connected to a separate computer control station located elsewhere on the main body of the tractor.

The computer control station, like the electrohydraulic valve assembly, is not an original feature of the excavating tractor and is configured and installed on the tractor body as part of the transformation of our invention. The computer control station can be housed in its own separate protective housing. One or more computers are included in the control station. Preferably the computer is a programmable computer, sold under the brand name IQAN, manufactured by Parker Hannifin, consisting of two components, a MC2 Master Unit and a XA2 Expansion Unit. The computer receives input from the joystick controllers in the form of multiple signals, in varying voltages, and translates them to open the correct valve work sections and the correct flow rate. In addition, the computer can also receive input from various sensors, located on the equipment, and will override joystick input, should the operator "ask" the equipment to perform an unsafe or prohibited task. The IQAN computer has an internal memory and programing changes require the use of a separately connected computer, preferably a laptop computer.

The computer can accept electrical inputs from hard wiring or through wireless connections, such as Wi-Fi, Bluetooth®, or similar wireless protocol connections. Wireless connections, however, require a secure connection, preferably a coded and/or encrypted connection to avoid accidental interception of a bogus wireless signal that could cause an unintended dangerous movement of the tractor or its moving parts.

Preferably, a hard-wired connection is used through an umbilical cable at least 10 feet in length, preferably at least 30 feet or longer. This cable is directly attached to a remote operator panel using removable plug-type connectors to provide quick connect/disconnect. The one or more computers are designed, configured and programed to accept electrical signals from one or more joysticks or other electronic controllers associated with and/or located in the remote operator panel. These signals are then processed by the computer and used to send signals to the electrohydraulic valve assembly whereby the spools in the valves are opened and closed in a progressive manner in order to precisely move the desired mechanical component on the tractor, such as, positioning the spray head or raising the arm.

The computer preferably is capable of being programed to preform a number of functions. For example, it could be programed to step through a predetermined wash sequence where the spray head is automatically positioned at predetermined locations around the process equipment for predetermined timed cleaning intervals. Likewise, the computer can be programed to override a signal received from one or more of the joysticks, especially when the compliance, processing or execution of the signal would cause movement or action of the tractor to be dangerous, hazardous or destructive. For example, the computer may be programed to prevent the spray head from pointing in a direction where the operator is located even though the operator may inadvertently manipulate the joysticks to aim the spray head in that direction. Likewise, the computer may be programed to monitor a number of sensors that have been set up to define a working perimeter. Then if the computer receives a signal from the operator panel where execution of the instructions corresponding to those signals would cause one or more parts of the washing device to stray outside of the established working perimeter, the computer would ignore the command.

One possible perimeter monitoring system comprises the use of a number of signal generating devices, such as infrared, thermal, motion, or other receivers or emitters, that can be manually placed around a given area to define a footprint of operation for the washing system of our invention. One or more corresponding and cooperative sensors located on the tractor would continuously monitor the signal generators defining the working perimeter and provide that information to the computer. The computer would determine and monitor the location of the tractor and its moving parts at all times. If the operator attempted to direct movement of the tractor or of a portion of the tractor outside the defined footprint, the computer would override and/or not execute the movement command. This type of monitoring and determination of the spatial position of the washing device could also be accomplished by the use of one or more digital, video cameras as well.

The input signals to the computer control station come directly from the remote operator panel either wirelessly or preferably through hard-wired electrical cable connection or umbilical. The operator panel can be handheld, supported by shoulder straps, or otherwise configured to be ambulatory with the operator so that the operator can easily move around the process equipment being cleaned yet standing far enough away to avoid blowback of cleaning fluid and/or removed material or having to wear special protective clothing and equipment. Alternatively, the remote operator panel may be housed in a protective booth or other enclosure that not only shields the operator, but also allows the inside environment to be controlled. In either case, the wash system of our invention allows the operator to be far enough away from the process equipment such that he does not need any form of protective clothing. The remote operator panel contains one or more electrical joysticks or other signal generating devices that are in electrical communication with the computer control station through the umbilical cable, or wirelessly or a combination of both. The preferred joysticks are ones that are sold under the brand name of IQAN, manufactured by Parker Hannifin. They are configured in such a manner so as to provide logical motion control for the operator. In other words, forwards means down, backwards means up, left means left and right means right. Joysticks that control the mechanical arm are of the pistol grip variety. Joysticks that control vehicle motion are simple levers with forward, neutral and reverse positions.

During the transformation of the excavating tractor a spray head is configured, assembled and added to the distal end of the arm in the general location where the original excavation tool would normally be located. This spray head contains at least two high-pressure spray nozzles that preferably are configured to rotate relative to the spray head assembly, and thereby provide an improved cleaning pattern. The spray head is preferably constructed to partially enclose the spray nozzles in a protective housing that surrounds the nozzles to define an annular space that is configured to capture and diffuse the energy of any blowback spray during the cleaning process, especially when the spray head is in close proximity to the equipment being cleaned. The housing can be made of any material that can withstand the rigors of industrial cleaning processes. The front outer surface of the housing may contain an attached removable protective surface comprising a softer material, such as a plastic like polypropylene or a similar material that acts as a protective bumper or guard to prevent damage to the process equipment and/or spray head in the event there is inadvertent contact between the spray head and the process equipment being cleaned.

The protective housing can also be configured to swing side-to-side and up and down using one or more hydraulically operated cylinders. Preferably the swing angle is 90 degrees to the right and 90 degrees to the left as measured from the centerline axis of the mount connected to the distal end of the arm. Of course, the arm itself is typically designed to have a given swing angle of about 0 to about 60 degrees measured relative to the axis of the main body of the tractor. And further, the main body of the tractor can rotate relative to the tracks, typically 360 degrees. This combination of possible movements provides very precise control of the spray head. In some cases it may be desirable to include one or more hard stops positioned in any of these swing angle or motion paths to limit the full range of motion of the spray nozzles, spray head housing, arm and/or tractor body. In addition to or alternative to hard stops, the stops may be force sensors that send a signal to the computer to stop unintended motion. Or, the maximum swing angle or range of motion of any one or more of these components may be programmed into the computer to control or limit movement, thus preventing the remote operator from inadvertently positioning the spray nozzles in an unwanted or dangerous position.

As mentioned, the spray head comprises two or more high-pressure spray nozzles. These nozzles are designed to produce focused water jets with a well-defined central core and are configured to rotate by using the reaction forces produced by the water jets, and thereby provide an improved cleaning pattern. A preferred nozzle is the model BC-K manufactured by StoneAge Waterblast Tools.

The cleaning fluid is supplied to the remotely controlled tractor by a high-pressure hose that is connected through a boom that is installed on and extends preferably from the rear of the tractor during the transformation process of our invention. The boom is configured and installed such that the hose is held up and away from the wheels or tracks to prevent or reduce the risk that the tractor will run over or get tangled up with the hose during the cleaning operation. The hose is connected preferably using quick disconnects to a 3-way valve that has been added to the tractor. This valve is preferably hydraulically operated and connected to the operator panel through the electrohydraulic valve assembly and the computer control station. In this manner the operator can manipulate the valve to direct the high pressure cleaning solution to the spray head or to a pressure relief position where the solution is discharged safely at low pressure. Likewise, in the case of a mishap, the computer can signal movement of valve to shut off flow to the spray head and to open the pressure relief position on the valve. The cleaning solution reservoir and the pump for pressurizing the cleaning solution is preferably located externally to the tractor. The preferred cleaning solution is water, however, any acceptable cleaning solution will work with our remotely controlled washing tractor. The spent cleaning solution with removed material from the process equipment can also can be collected, separated to recover the cleaning solution and then recycled and reused in our washing system.

The tractor can also have a number of safety signaling devices that employ visual and/ or audible prompts or warning signals, such as lights, bells, horns, whistles and the like that are activated anytime the tractor is in operation in order to provide the operator and others in the vicinity with knowledge/warning that the washing system of our invention is energized. When the use of our wash system is required in closed or indoor work area where the exhaust from an internal combustion engine would be harmful, an external hydraulic fluid line can be used to supply high-pressure hydraulic fluid to the electrohydraulic valve assembly thereby eliminating the need to activate/run the on-board tractor motor and associated hydraulic pump.

These and other objects will become more apparent from the detail description of the preferred embodiment contained below.

BRIEF DESCRIPTION OF THE FIGURES

Without any intended limitation to the scope of the claims, one or more embodiments are described below with reference to the drawings in which:

Like elements, elements of the same kind and identically acting elements are provided with the same reference numerals in the figures.

DETAILED DESCRIPTION

Figure 1:
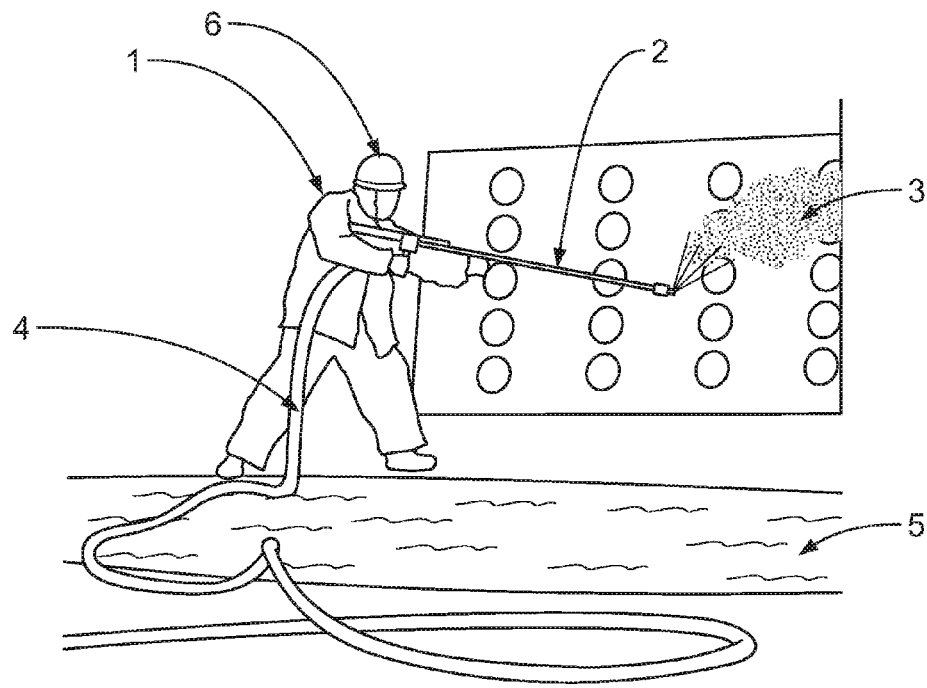
FIG. 1 schematically illustrates a prior art high-pressure washing system that involves the use of a hand-held lance.

As stated, our invention prevents a novel method of manufacturing a remotely operated washing system whereby a small excavating tractor is converted to remotely controlled and computer operated high pressure washing apparatus for cleaning of process equipment. The resulting washing system of our invention greatly improves upon current methods of hydroblasting, including that illustrated in FIG. 1 where an operator 1 is required to hold a high pressure lance 2 while cleaning the process equipment 3. The lance is connected to a large heavy supply line 4 that the operator must manipulate while standing in pools 5 of cleaning solution and debris removed from the equipment being cleaned. Because the lance must be placed close to process equipment 3 the operator is subject to a blowback mix of removed debris and cleaning solution and therefore must wear protective clothing including hardhat and face shield 6. Fouling of the face shield requires the operator to constantly interrupt the cleaning process in order to wipe the shield clean. These delays contribute to operator fatigue as the cleaning process necessarily takes longer to complete.

Figure 2:
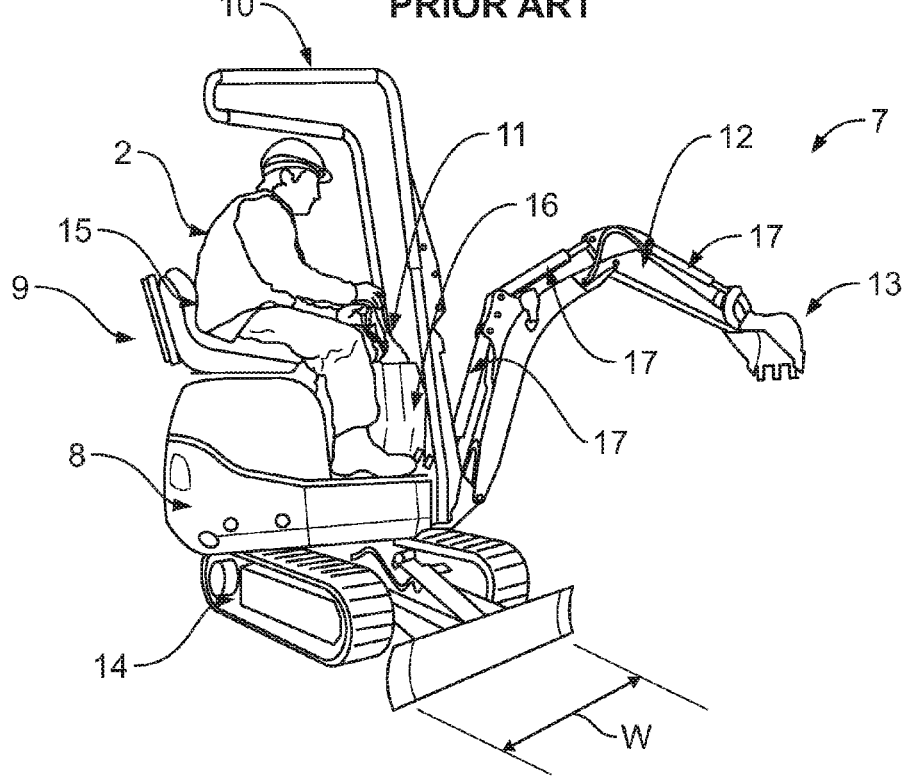
FIG. 2 schematically illustrates a small excavating tractor that is presently commercially available.

Our invention eliminates many if not all of the problems associated with industrial cleaning processes that use a high-pressure lance. Our invention starts with a miniature-excavating tractor 7 as depicted in FIG. 2 that requires an operator 2 seated in an operator area 9. The tractor has a centerline axis running from the front to the rear of the tractor. The operator area 9 contains a seat 15, a safety cage/compartment 10, and manually operated levers 11 that control mechanical hydraulic cylinders 17. The operator 2 manipulates levers 11 & 16 to move the tractor 7 along tracks 14, to rotate body 8, to swing and raise arm 12, and to manipulate excavation tool 13. Arm 12 is operated by a number of hydraulic cylinders 17. The tractor preferably has a width W of no more than 5 feet, preferably about 3 feet or less. The next step in our manufacturing process is to remove the seat 15, safety cage 10 and levers 11, thus rendering the tractor impossible to be driven and operated by an operator riding the tractor. Excavation tool 13 is also removed from the distal end of arm 12.

Figure 3:
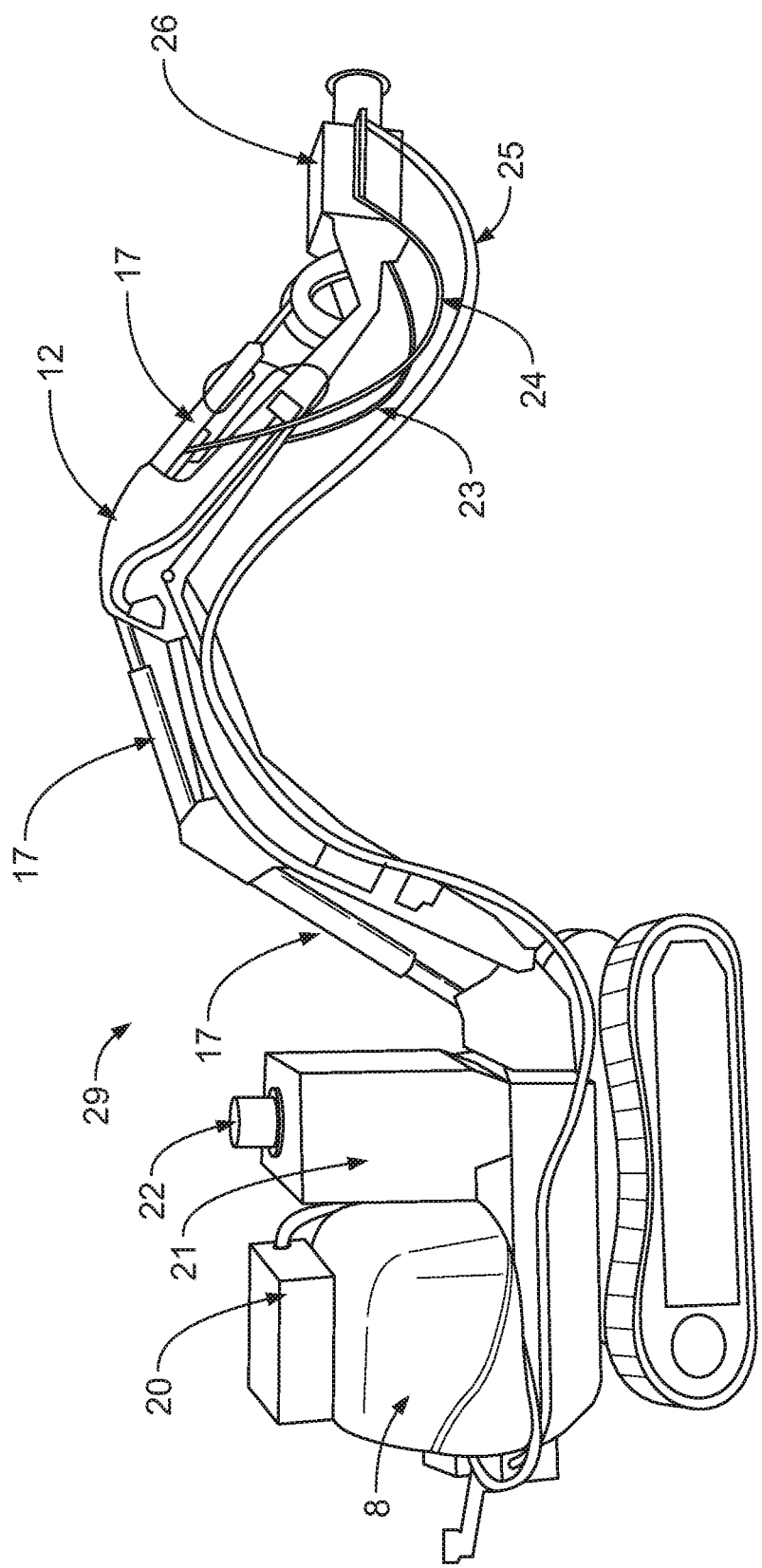
FIG. 3 illustrates one embodiment of the washing system of our invention.

FIG. 3 shows one embodiment of our invention after the manufacturing process is completed. The operator area of the original excavating tractor was replaced by a computer control station 20 and an electrohydraulic valve assembly 21, each shown enclosed in a protective housing. A safety light 22 is shown attached to the housing for the electrohydraulic valve assembly but could be located on any part of the washing system. Light 22 is configured to provide a visual indication that the washing system is activated. Horns, whistles, bells or other audible signals can supplement light 22. Original hydraulic cylinders 17 used to control movement of arm 12 are not removed during the process of our invention. Likewise the engine and hydraulic pump (not shown) within body 8 remains operational. A high pressure spray head assembly 26 is added during the manufacturing process as well as two hydraulic lines 23 and 24 that are used to operate small hydraulic cylinders in the spray head assembly as will be described in more detail below. High-pressure line 25 is also added to the washing system to supply cleaning solution to the spray head assembly 26.

Figure 4:
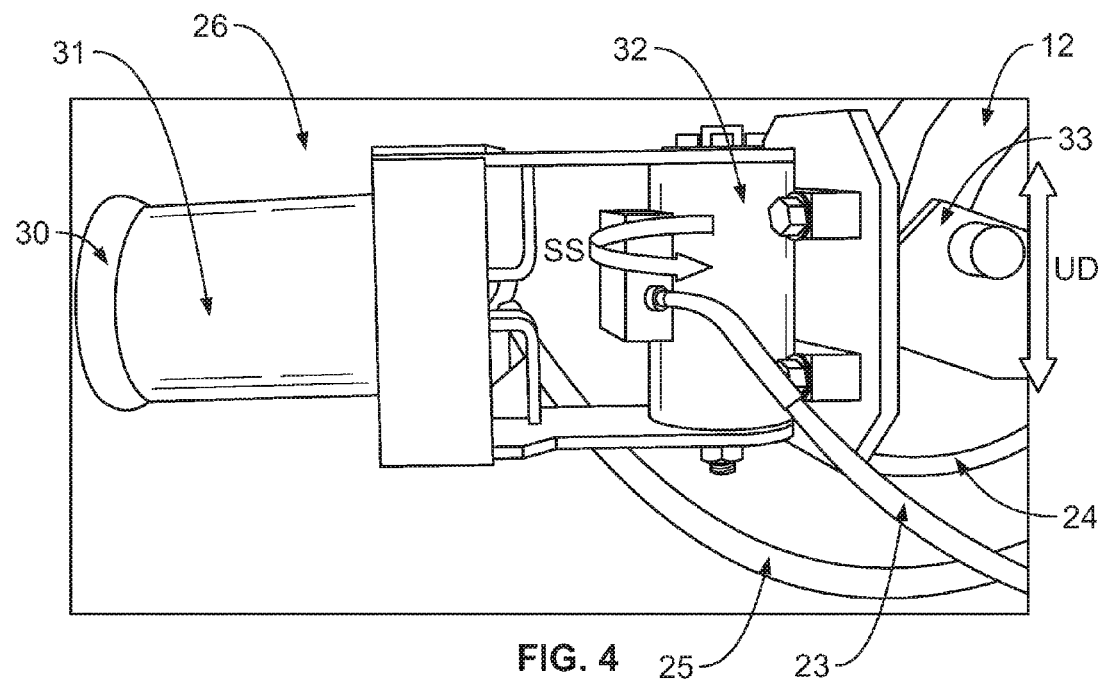
FIG. 4 illustrates a close-up side view of the spray head of the embodiment shown in FIG. 3.
Figure 5:
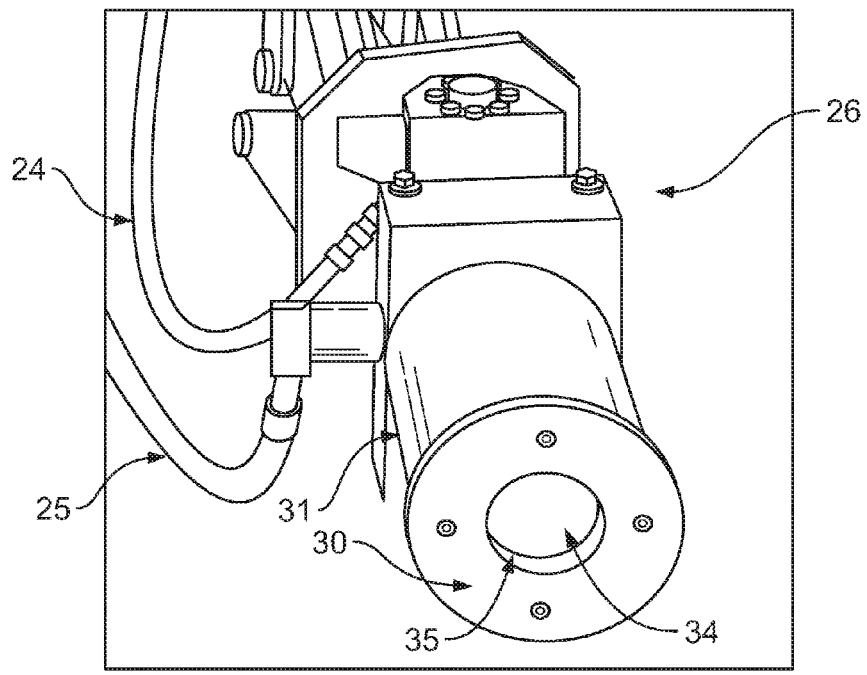
FIG. 5 shows a close-up front perspective view of the spray head of the embodiment shown in FIG. 3.

FIG. 4 illustrates a close up side view of the high-pressure spray head assembly 26 of our invention and FIG. 5 shows a head-on perspective view where the spray nozzles 34 can be seen within protective housing 31. An annular space 35 between nozzles 34 and the interior surface of housing 31 is configured to capture and dissipate the energy of any blowback of the cleaning solution when the spray head 26 is in close proximity to the process equipment being cleaned. A protective, removable bummer 30 defines part of the annular space 35 and is made of a softer material than housing 31. Hydraulic line 23 supplies hydraulic fluid that moves cylinder 32 causing the spray head to move from side-to-side along direction SS in a swing angle of up to about 180 degrees as measured relative to the centerline axis of the tractor. Hydraulic line 24 is connected to cylinder 33 which moves the spray up and down along direction UD relative to arm 12. High-pressure line 25 is added to the tractor body 8 as part of the manufacturing steps of our invention. This line is preferably capable of delivering cleaning solution at a maximum pressure of up to about 20,000 psig and is preferably operated in a pressure range of from about 5000 psig to about 20,000 psig. This allows the spray head to deliver cleaning solution at thrusts up to about 110 pounds.

Figure 6:
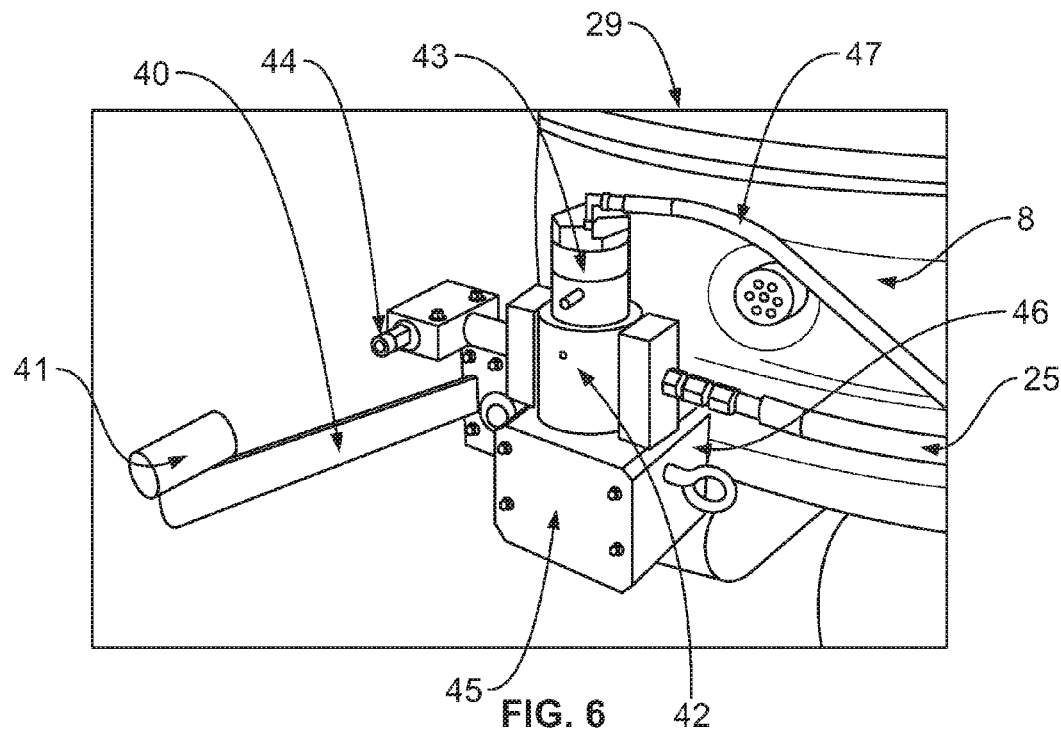
FIG. 6 shows the hose boom and the hydraulically activated valve to control the high pressure cleaning fluid flow.

FIG. 6 shows the rear or backend of washing system 29 where a high pressure cleaning solution flow control valve assembly 45 is located. This assembly is added as one of the manufacturing steps of our invention. The assembly 45 has a two-way valve 42 that is supported on mount 46 that also has attached a boom 40 configured to accept a cleaning solution supply line (not shown). This supply line is feed through annulus 41 that is at the distal end of boom 40. The length of boom 40 is chosen to keep the supply line held off the ground and away from body 8, thus preventing the washing system from running over or getting tangled up with the supply line. The supply line is attached to the washing system by first feeding the line through annulus 41 and then connecting a fitting to a corresponding or matching fitting 44, preferably a quick disconnect type fitting. The high-pressure cleaning solution is pumped from an external reservoir and delivered to a three port, two-way valve 42 that is opened and closed using hydraulic activator 43 that receives hydraulic fluid from line 47. This two-way valve has a first position where the cleaning solution is delivered to line 25 when it is desired to use the spray head to clean process equipment and second position when the operator wants to stop the flow of cleaning solution to the spray nozzles. In this second position, the cleaning solution is diverted down and away from body 8 at low dissipated pressure. Switching between the two positions of the two-way valve is accomplished by movement of hydraulic activator 43 that is supplied with hydraulic fluid through line 47 and through one of the electrohydraulic valves in assembly 21 that is controlled by the computer control station 20.

Figure 7:
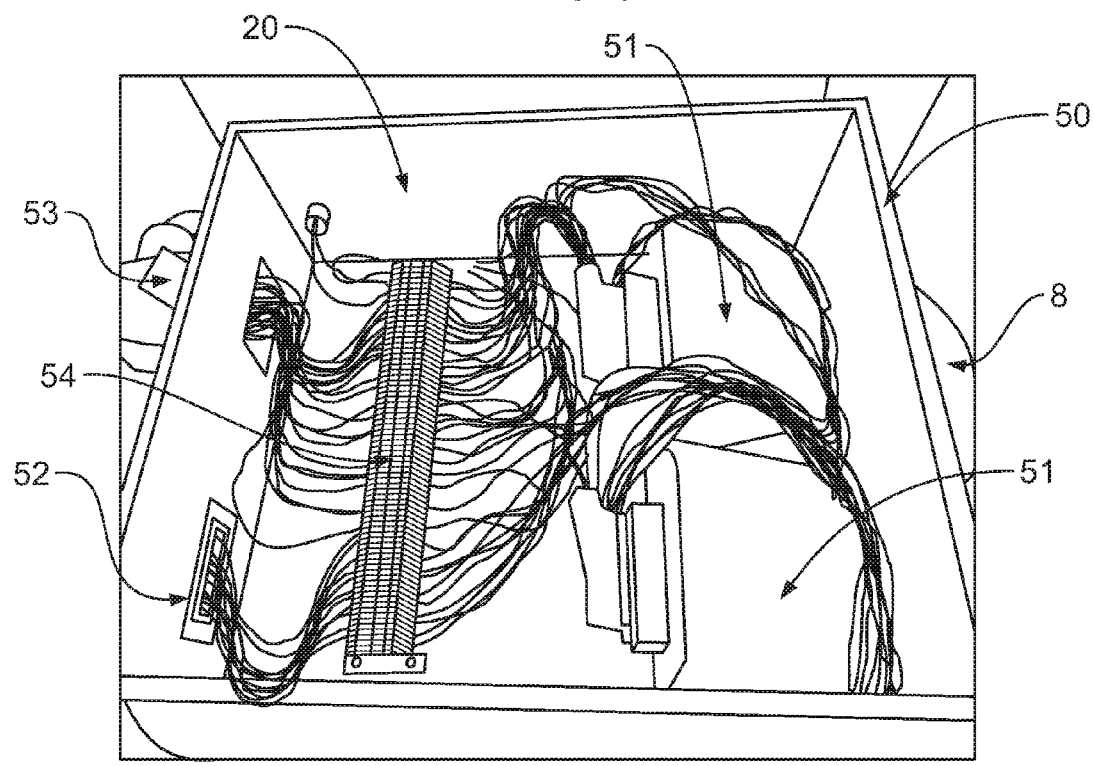
FIG. 7 illustrates one embodiment of the computer control system.

Computer control station 20 is yet another component that is assembled, configured, programed and added during the manufacturing process of our invention. Computer control station 20 is contained in housing 50 as shown in FIG. 7, where the top (not shown) has been removed. When the top of computer control station 20 is in place (see FIG. 3) the housing provides protection so that no moisture or other contaminate can reach the inside of station 20. One or more computers 51 are located in hosing 50 and are connected to electrical wires through terminal strip 52. Terminal strip 52 is hardwired to output connector 53 that connects to a bundle of wires or cable 73 (see FIG. 9) that supplies electrical signals to electrohydraulic valve assembly 21. Input 52 also connects a series of wires to terminal strip 54 and eventually computers 51. Input 52 is connected via cable or umbilical 75 to remote operator panel 70 (see FIG. 9). Computers 51 are programed either before or after installation in housing 50. As mentioned, these computers operate or otherwise communicate with the electronic portion of the electrohydraulic valves in assembly 21 that in turn operate/control each of the hydraulic cylinders and other hydraulically operated components of washing system 29.

Figure 8:
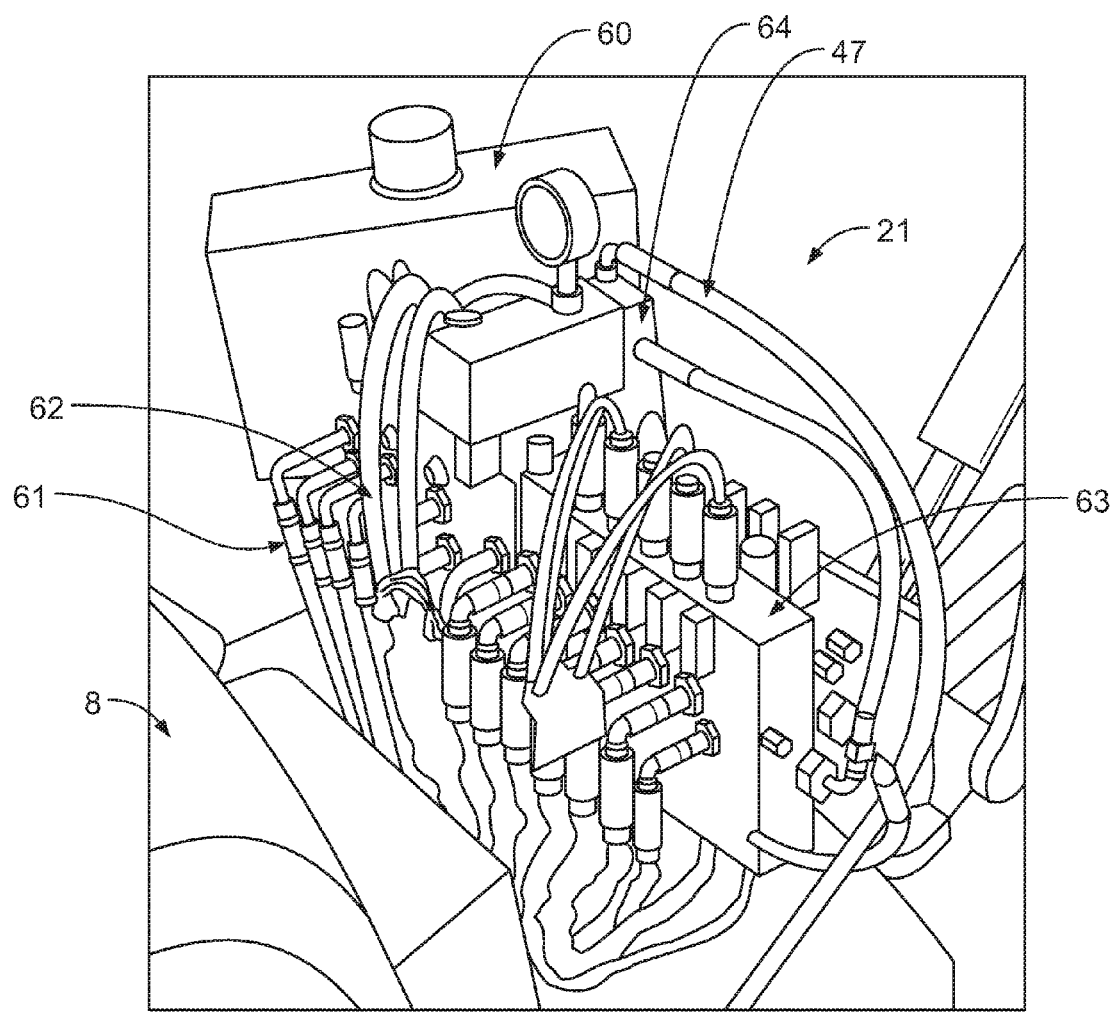
FIG. 8 illustrates one embodiment of the electrohydraulic valve assembly.

FIG. 8 shows the electrohydraulic valve assembly 21 that is configured and added to body 8 as part of the manufacturing process of our invention. Protective cover 60 is shown removed in order to view the electrohydraulic valves 63 that are connected to electrical wires 62 from cable 73. Hydraulic lines 62 are also connected to valves 63. Three port valve 64 is used to supply hydraulic pressure through hydraulic hose 47 to hydraulic activator 43 to open or close the three port, two way valve 42.

Figure 9:
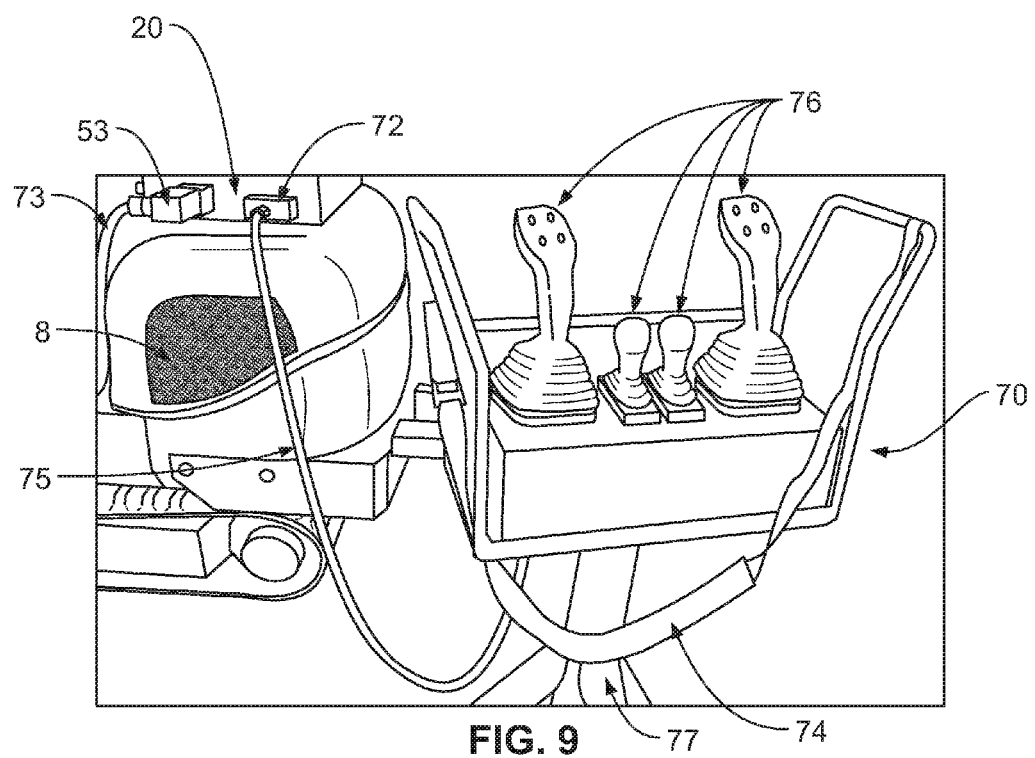
FIG. 9 illustrates one embodiment of the remote operator panel.

FIG. 9 presents one possible embodiment of a remote operator panel 70 that must be assembled, configured and attached via cable 75 as part of the manufacturing steps of our invention. Cable 75 can be of varying length, however, a preferred length of at least 30 feet is desired and most preferably a length of from about 25 feet to about 150 feet. Panel 70 contains one or more joystick type controllers 76 that can be manually manipulated by an operator to send electrical signals to computers 51 that in turn process the signals into operational signals supplied to the electrohydraulic valves to cause the operator's desired movement of particular mechanical components of wash system 29, for example, raising or lowering arm 12 or swinging of spray head 26. Panel 70 can be positioned on stand 77 or alternatively removed from the stand and worn/carried by the operator using shoulder strap 74. This allows the operator to move around the process equipment being cleaned to more accurately direct the spray head.

Although the example embodiment of the washing system of our invention was described for use in hydroblasting of process equipment, the system may also be used for a number of other applications, such as hydro demolition and/or hydro excavation. Hydro demolition, as the named implies, is destructive removal process that utilizes high-pressure water to remove deteriorated and sound building materials, such as concrete, asphalt, and grout. The process is used to provide a bonding surface for repair material and new coating applications. Hydro excavation uses vacuum to remove dirt or other debris that has been loosened with a high-pressure water jet. This process is typically used for safely finding and seeing underground utilities because it greatly reduces the chance of damaging the buried utilities that can occur using traditional mechanical excavating tools, such as jack hammers or backhoe buckets. The washing system of our invention could include the installation of a large mouth vacuum hose at the distal end of the arm near the spray head or a modified spray head/vacuum hose combination may be employed where both the water jet and vacuum are remotely controlled and operated by the computer control station receiving commands from the operator panel.

In all applications of our washing system, another possible added feature is to include in the method of manufacturing the step of mounting one or more digital cameras to the spray head or distal end of the arm to allow the operator to see in real time a close up view of the working surface being treated. The camera should be mounted in a protective housing to prevent damage and should include a lens or window cleaning system that can periodically clean and remove debris that would obscure the visibility of the camera lens. One possible cleaning system would be akin to the systems employed on automobile headlamps that use a combination of small jets of cleaning solution and wiper blades.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

The invention claimed is:

1. A method of manufacturing a remote controlled washing system for use in cleaning industrial process equipment comprising,
   a) obtaining a compact motor driven excavating tractor having a centerline axis and a maximum width of less than about 3 feet and having an operator area comprising a seat, manual controls, and safety cage, where the tractor further comprises a hydraulically operated arm having a distal end configured for attaching an excavation tool and where the manual controls are directly connected to mechanical hydraulic valves that direct movement of the tractor and the arm through hydraulic fluid lines;

b) removing the seat, the manual controls, the safety cage and the excavation tool if attached;
c) assembling and adding a high pressure spray head to the distal end of the arm;
d) assembling and adding a computer control station to the tractor;
e) assembling and adding an electrohydraulic valve assembly to the tractor in communication with the computer control station, whereby the communication between the computer control station and the electrohydraulic valve assembly is through a plurality of solenoids operatively connected through mechanical engagement with the electrohydraulic valve assembly and connected to the computer control station through a plurality of electrical wires;
f) assembling a remote operator control panel configured to connect with the computer control station such that the remote operator control panel will operate and control the compact motor, the hydraulically operated arm, the electrohydraulic valve assembly, and the the high pressure spray head when connected to the computer control station;
g) connecting the hydraulic lines to the electrohydraulic valve assembly whereby an operator using the remote operator control panel can provide input signals to the computer control station that in turn sends electrical signals to the solenoid that mechanically manipulate the electrohydraulic valve assembly to control movement of the tractor and the arm from a distance of at least about 10 feet; and
h) assembling and connecting a cleaning solution supply assembly to the tractor in fluid communication with the spray head.

2. The manufacturing process of claim 1 wherein the assembly of the spray head includes providing a protective housing having an annular space surrounding two or more spray nozzles.

3. The manufacturing process of claim 1 wherein the assembly of the spray head includes providing a hydraulic cylinder that moves the spray head through a swing angle of up to 180° as measured relative to the centerline axis.

4. The manufacturing process of claim 1 wherein the assembly of the cleaning solution assembly includes adding a boom and a hydraulically activated three-way valve.

5. The manufacturing process of claim 1 wherein the assembly of the remote operator control panel includes adding at least two electronic joysticks in electrical communication with the computer control station.

6. The manufacturing process of claim 1 wherein the assembly of the computer control station includes adding at least one computer to a protective housing and programing the computer to accept signals from the remote operator control panel and to send an operation signal to the electrohydraulic valve assembly.

7. The manufacturing process of claim 1 wherein a first cable is removably connected between the computer control station and the electrohydraulic valve assembly and a second cable is removably connected between the remote operator control panel and the computer control station.

8. The manufacturing process of claim 1 wherein the electrohydraulic valve assembly contains more valves than the mechanical hydraulic valves originally present on the excavating tractor and wherein the electrohydraulic valves can operate at a hydraulic fluid flow rate in the range of from about 1to about 2 gallons/minute.

\* \* \* \* \*